United States Patent
Duke et al.

(10) Patent No.: US 8,620,700 B2
(45) Date of Patent: Dec. 31, 2013

(54) MANAGEMENT OF NEW OFFERING DEVELOPMENT VIA VALUE FLOW CONTROL

(75) Inventors: Charles B. Duke, Webster, NY (US); John F. Knapp, Fairport, NY (US); Alfons A. Gosiewski, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1797 days.

(21) Appl. No.: 11/311,098

(22) Filed: Dec. 19, 2005

(65) Prior Publication Data

US 2007/0143160 A1    Jun. 21, 2007

(51) Int. Cl.
*G06Q 10/00* (2012.01)
(52) U.S. Cl.
USPC ......... 705/7.11; 702/181; 705/7.27; 705/7.28
(58) Field of Classification Search
USPC .................... 702/181; 705/7.11, 7.27, 7.28
See application file for complete search history.

(56) References Cited

U.S. PATENT DOCUMENTS

| | | | |
|---|---|---|---|
| 7,305,351 B1* | 12/2007 | Bechhofer et al. | 705/7.28 |
| 2002/0174049 A1* | 11/2002 | Kitahara | 705/36 |
| 2003/0023470 A1* | 1/2003 | Labbi | 705/7 |
| 2003/0050812 A1* | 3/2003 | Clark et al. | 705/7 |
| 2003/0135399 A1* | 7/2003 | Ahamparam et al. | 705/7 |
| 2003/0208429 A1* | 11/2003 | Bennett | 705/36 |
| 2004/0230397 A1* | 11/2004 | Chadwick | 702/181 |

OTHER PUBLICATIONS

F. Peter Boer, Risk-Adjusted Valuation of R&D Projects, Research Technology Management; Sep./Oct. 2003, p. 50-58.*
Trifle, Gary L; Scriven, Eric F V; Fusfeld, Alan R. Resolving uncertainty in R&D portfolios. Research Technology Management 43.6 (Nov./Dec. 2000): 47-55.*
"Revolutionizing Product Development, Quantum Leaps in Speed, Efficiency, and Quality" Steven C. Wheelwright and Kim B. Clark, The Free Press, New York, 1992 (5 pages).
"Product Development: Success Through Product and Cycle-time Excellence", Michael E. McGrath, Michael T. Anthony and Amram R. Shapiro Butterworth-Heinemann, Boston, 1992 (6 pages).
"Open Innovation: The New Imperative for Creating and Profiting from Technology" Henry W. Chesbrough, Harvard Business School Press, Boston, 2003 (3 pages).
"Applying 'Options Thinking' to R&D Valuation" Terrence W. Faulkner, Research-Technology Management, May-Jun. 1996, (pp. 50-56).
"Risk-Adjusted Valuation of R&D Projects" F. Peter Boer, 2003 Research-Technology Management, Sep.-Oct. 2003 (pp. 50-58).
"Real Options: Managing Strategic Investment in an Uncertain World" Martha Amram and Nalin Kulatilaka, Harvard Business School Press, Boston, 1999 (4 pages).

(Continued)

*Primary Examiner* — Lynda Jasmin
*Assistant Examiner* — Timothy Padot
(74) *Attorney, Agent, or Firm* — Fay Sharpe LLP

(57) ABSTRACT

A business method for defining, controlling, and optimizing a flow of value down a workflow pipeline includes creating a phase-gate workflow pipeline for one or more projects in which completion of one or more predetermined activities of each project advances the project to a succeeding phase in the pipeline. Each of the activities for each project in the pipeline is mapped to a value metric that is a function of a risk discount factor using an option valuation technique. The projects and/or portfolio of projects are then analyzed to determine the flow of value down the pipeline and managed based on analysis of this flow of value.

17 Claims, 2 Drawing Sheets

(56) References Cited

OTHER PUBLICATIONS

"Factory Physics: Foundations of Manufacturing Management, Second Edition" Wallace J. Hopp and Mark L. Spearman, Irwin McGraw-Hill, Boston 2000 (12 pages).

"Principles of Corporate Finance, Fourth Edition" Richard A. Brealey and Stewart C. Myers, McGraw Hill, New York, 1996, Chapter 20 "Corporate Liabilities and the Valuation of Options" (pp. 483-510) and Chapter 21 "Applications of Option Pricing Theory" (pp. 511-534) (69 pages).

"The Smart Organization: Creating Value Through Strategic R&D" David Matheson and Jim Matheson, Harvard Business School Press, Boston, 1998, pp. 52-54 (7 pages).

\* cited by examiner

MANAGEMENT OF NEW OFFERING DEVELOPMENT VIA VALUE FLOW CONTROL

BACKGROUND

The following relates to managing projects and/or portfolios of projects. It finds particular application to business methods that facilitate managing projects and/or portfolios of projects throughout the life cycle of the projects as value flowing through a workflow pipeline.

Selecting and evaluating research projects, the ultimate value of which can only be established in the distant future after factoring in the contributions of others, are classic problems in portfolio analysis. Traditionally, phase-gate based product development techniques have been used to model project flow. With a typical phase-gate based technique, each project is defined through its activities and evaluated through the completion of a one or more of the project activities at each phase gate. Conventionally, phase-gate based techniques are executed as open loop processes without explicit feedback.

Real options analyses have been used to estimate the value of individual research and development projects. Such estimates are often used in the selection of projects, but have not been deployed as an integral part of ongoing project management as projects traverse a phase gate development workflow pipeline. Conventional techniques for controlling the flow of activities through such pipeline are well developed. However, with research and development projects, such techniques typically are only applied in qualitative form to manage project activities, but not project value explicitly.

Research and development operations are, in effect, design factories for the future offerings of a firm. As such, the flow of projects through these organizations should be amenable to evaluation and control by the techniques of manufacturing systems engineering. Thus, what is needed are systems and methods that enable projects and/or portfolios of projects to be monitored and managed as flow of value down a workflow pipeline. Such systems and methods enable the assessment and management of the creation of value by research and development projects while they are being executed rather than ex post facto.

BRIEF DESCRIPTION

In one aspect, a business method for defining, controlling and optimizing a flow of value down a workflow pipeline is illustrated. The business method includes creating a phase-gate workflow pipeline for one or more projects in which completion of one or more predetermined activities of each project advances the project to a succeeding phase in the pipeline. Each of the activities for each project in the pipeline is mapped to a value metric that is a function of a risk discount factor using an option value technique. Completion of individual activities in each project affects the risk discount factor associated with that project and hence influences directly the valuation of the project. Completion of individual project activities also influences project valuation by virtue of modifications of the probability that the project will exit the nearest phase gate to proceed further down the pipeline. Hence at any time the projects and/or portfolio of projects are analyzed in terms of the flow of value down the pipeline and managed based on analysis of the flow of value.

DETAILED DESCRIPTION

The embodiments herein combine adaptations of phase-gate based product development, real option valuation of research and development (R&D) projects, and industrial management of flow control of manufacturing processes into a business method for managing the definition, selection, control, and/or valuation of projects over the life cycle the projects (e.g., from the development of new offerings from R&D through launch and maintenance in the field).

Figure 1:
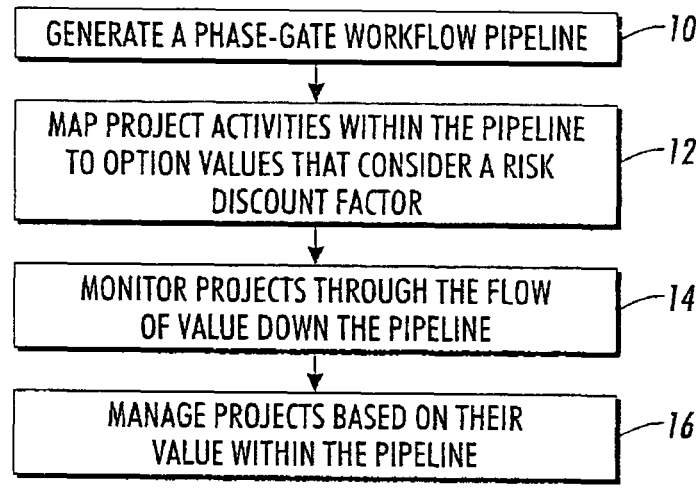
FIG. 1 illustrates a business method for managing new offering development via value flow control is illustrated.

With reference to FIG. 1, a business method for managing new offering development via value flow control is illustrated. At 10, a conventional phase-gate based workflow project pipeline is generated for one or more projects. This workflow pipeline includes a plurality of phase-gates spanning a life cycle of each offering in which each phase gate is associated with exit criteria. Within a conventional phase-gate based workflow project pipeline, projects typically are delineated by project activities and the focus is on completing of a predetermined set of project activities in order to advance through a phase-gate to a next phase in the pipeline.

At 12, an options analysis technique is used to map each of the project activities of each project in the pipeline into a value based metric. The technique used herein extends conventional research and development options analyses to include a risk discount factor that is a function of various types of risk that are amenable to reduction during the phases of the pipeline offering development process. Examples of suitable risks include, but are not limited to, product risks, market risks, value chain risks, technology risks, financial risks, management risks, etc. Each of these risks is specified in detail in terms of outcomes affected by project activities and assessed quantitatively to give a numerical value of the overall risk discount factor. The discount factor can be periodically updated through a prescribed process for assessing the above-noted risk elements affecting the ultimate value of the associated project as well as other risks.

Such valuation permits an explicit linkage of the project activities conducted in each stage of the phase gate process to the reduction of risk, and hence to the increase in the valuation of the project accomplished during that stage. That in turn enables the offering development pipeline to be mapped into a value generation pipeline in which reduction of risk by individual offering development projects during the stages of the phase gate process are mapped into changes in their values and monitored as value flows down the pipeline as projects progress from one phase gate to the next. This permits each phase gate stage of individual development projects to be described in terms of the value created during the stage, and hence permits the value generated by the entire pipeline portfolio to be managed by industrial manufacturing flow management techniques in order to maximize the creation of value subject to both internal resource constraints and external events that influence the value of projects in the pipeline.

At 14, each of the projects and/or the portfolio of the projects can be monitored through one or more of the value metrics as flow of value down the pipeline. For example, the value of each of the projects, and hence the portfolio, can be periodically reviewed to determine one of a rate of increase and a rate of decrease of the value in the pipeline, or the ongoing value of the projects. In one example, a value of each project can be computed by aggregating the value of the activities in the project. In another example, the value of each project, at any given time, can be determined as a function of the value of completed activities and the value of prospective activities for each project. In yet another example, the value of the portfolio, at any given time, can be computed as the aggregate value of each of the projects within the portfolio.

At 16, one or more projects and/or the portfolio of projects are managed through the flow of value down the pipeline. The flow of value over time can be managed by standard industrial manufacturing flow control techniques in order to optimize the flow of value down the pipeline in the presence of one or more constraints (e.g., money, skills, time, etc.). This enables the management of the projects in the pipeline to be based on a rate of creation of value both by each individual project and by the portfolio as a whole rather then merely the state of the various activities in the different phases. For example, the funding for any particular project may be based on the project's current contribution to the flow of value down the pipeline or on the availability of resources to move the project through the next phase in the pipeline.

The foregoing allows the results of project activities to be converted into risk reduction (and hence valuation) so that a project manager or other user can assess substantially all risks encountered and devote resources and attention to reducing those risks that result in the largest increase in valuation. The results can be used by the project manager to variously structure their projects and/or implement tradeoffs within them. It also permits feedback from changes in the market, competitive offerings, and technology to be incorporated into the valuation of the project in real time. Therefore, the project value becomes a dynamic variable that is affected by project activities, project portfolio tradeoffs, project risks, external events during the period while the project is moving from one phase gate to the next, etc. This allows the management of the portfolio of projects to use feedback from both the project performance and external events to optimize the creation of value in the portfolio by shifting resources from one project to another, canceling unpromising projects more quickly, adapting the objectives of the projects and/or other control actions.

Figure 2:
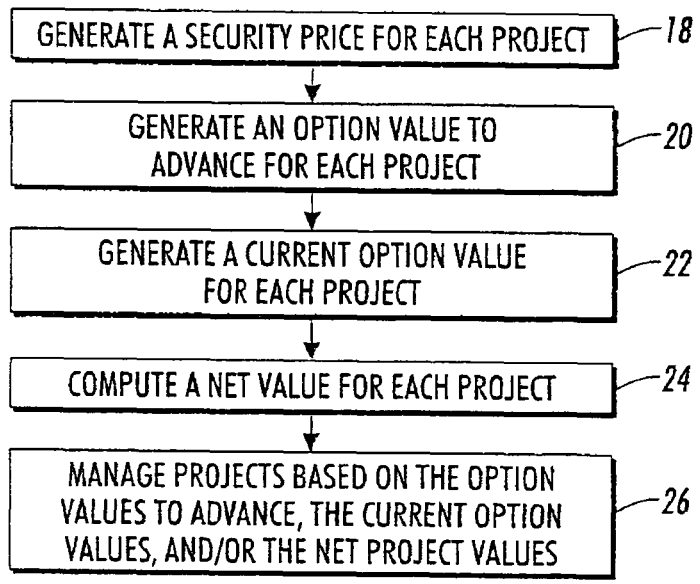
FIG. 2 illustrates an exemplary system for implementing the method described herein.

FIG. 2 illustrates a non-limiting example of using the business method described in connection with FIG. 1 to manage projects through value. At 18, an underlying security price is generated for each project in a workflow project pipeline. In one instance, the underlying security price is computed as a product of a risk discount factor (RDF) and estimated profits (EP) (e.g., RDF×EP). The risk discount factor is obtained through a prescribed process for assessing the elements of risk affecting the ultimate value of the associated project. In one instance, the prescribed process includes an assessment of product risk, market risk, value chain risk, technology risk, financial risk, management risk, etc. For example, the prescribed process may include a questionnaire with questions addressing product risk, market risk, value chain risk, technology risk, financial risk, management risk, etc., wherein at least the answers to one or more of the questions are used to determine the risk discount factor. The risk discount factor is the mechanism whereby feedback from both external events (e.g., the entrance of a new competitor) and internal changes in the pipeline (e.g., the cancellation of another product development program) are incorporated explicitly into the project valuation. Feedback from external events (e.g., the introduction of a competitive product resulting in a reduced expected market share) also may be incorporated into the calculation of the estimated profit. Thus, the underlying security price is a dynamical variable that changes throughout the course of the project.

The estimated profits can be obtained via any technique used to estimate profits. For example, the estimated profits can be computed from metrics such as estimated revenue, cost rates, tax rate, discount rate, etc. to render estimated time discounted profits. By way of example, the profits can be estimated as a function of the following:

$$\text{Estimated Profits} = \sum_{n=1}^{n=N} \frac{Revenue_n \times (1 - \text{Total Cost Rate}) \times (1 - \text{Tax Rate})}{(1 + \text{Cash Discount Rate})^n},$$

Wherein n and N are integers equal to or greater than one and $Revenue_n$ corresponds to the projected revenue in a time period labeled by n associated with the contribution of project to an offering in the market. In another example, consider a project for designing and developing a new sensor for a current product which may reduce the unscheduled maintenance (UM) rate for each machine, increase print volume, reduce the test time spent at the end of the production line, etc. Typically, all the data are not well known. However, a Monte Carlo model using educated but reasonable ranges for various criteria can be used to estimate profits. For instance, the Monte Carlo model can be provided with information such as a potential number of machines affected, a potential UM reduction, a cost per UM, revenue/print, etc. With such information, the Monte Carlo model can compute the estimated revenue as well as derive other information there from (e.g., revenue distributed by year, etc.).

At 20, an option value to advance is generated for each project in a workflow project pipeline. In one instance, the option value to advance can be computed via the Black/Scholes Real Option and/or similar calculation, which converts the underlying security price, or the risk reduced time discounted profits, to a real option value. The calculation may include knowledge of future investment (e.g., estimated next years investment, etc.), the time available to make future decisions, a risk free interest, a volatility of the investment (e.g., the standard deviation of the underlying security price divided a mean of the underlying security price), etc.

At 22, a current option value is generated for each project in a workflow project pipeline. In one instance, the current option value is a computed as a product of the option value to advance and a probability of exiting a current phase. The probability of exiting a current phase can be a predetermined probability based on the historical record of projects exiting in the current phase or it can be a dynamical variable whose value is linked explicitly to the completion of activities within the phase gate. In one instance, these probabilities are fixed. In another instance, these probabilities may change over time.

At 24, a net value is generated for each project in a workflow project pipeline. In one instance, the net value is computed as the current option value less a current investment, which typically includes the investment of all contributing projects. A net portfolio value can be obtained by summing the net value of various projects. The summation can include weighting factors in order to factor in various other characteristics.

At 26, the option value to advance, the current option value, and/or the net value can be monitored at any time and used to manage the projects in the pipeline. Value flows are obtained by evaluating differences in these values over time, typically from quarter to quarter in common review processes. As previously described, the flow of value overtime can be managed by industrial manufacturing flow control techniques. Project managers can variously structure their projects and/or implement tradeoffs within them and feedback from changes in the market, competitive offerings, and technology can be incorporated into the valuation of the project in real time. This provides management with real-time metrics that can be used to optimize value flow in the portfolio by shifting resources from one project to another, canceling unpromising projects more quickly, adapting the objectives of the projects and/or other control actions.

Figure 3:
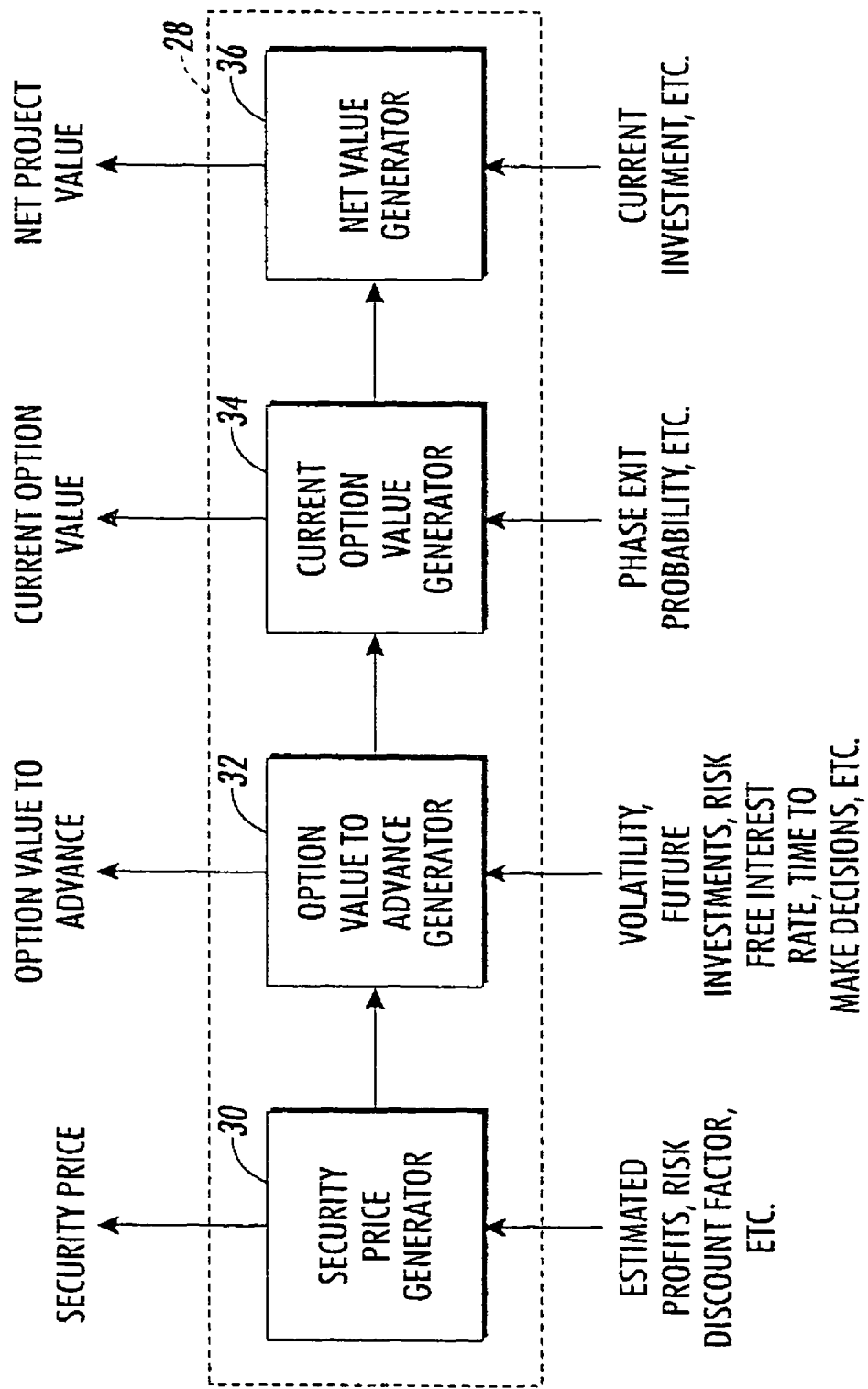
FIG. 3 illustrates a non-limiting example of using the business method for managing projects.

FIG. 3 illustrates an exemplary computing system for implementing the method described in FIG. 2. The computing system can be a computer or similar device with a processing component, storage, input/output, etc., which receives various inputs and generates results that are used to manage projects (e.g., a next generation multi-functional printing platform project). In one aspect, the computing system includes a valuation component 28, which receives various information and computes the value of projects and portfolio of projects. A security price generator 30 computes a security price for each project in a workflow project pipeline. As depicted, the security price generator 30 can receive a product of a risk discount factor and estimated profits and compute the security price for each project based on the product of the risk discount factor and the estimated profits. In one instance, the security price for each project is computed as the product of the product of the risk discount factor and the estimated profits. The risk discount factor and the estimated profits can be obtained as described above. This is typically the component where feedback is incorporated from external and internal events that are most likely to directly influence the activities undertaken by a project. The computed security prices can provided to an option value to advance generator 32, which can compute an option value to advance for each project based on the security prices, a volatility (e.g., the standard deviation of each security price divided by its mean), estimated future investment, the time available to make future decisions, a risk free interest, etc. As described above, the Black/Scholes Real Option calculation or other option calculating technique can be used such information to compute real option values. These variables also can change over the life of a project but their changes typically exert a smaller influence on project valuation than those associated with the risk discount factor and estimated profits.

The computed option values to advance can be provided to a current option value generator 34. This component can computed a current option value as a product of the option value to advance and a probability of exiting a current phase, which can be a predetermined probability based on the historical record of projects exiting in the current phase or a dynamical variable that depends on the learning created by project activities. The computed current option values can be provided to a net value generator 36. The net value generator 36 computes the net value of each project, for example, as the current option value less a current investment. The current investment may include the investment of all contributing projects. A net portfolio value can be obtained by summing the net value of various projects. The summation can include weighting factors in order to factor in various other characteristics.

The option value to advance, the current option value, and/or the net value can be used to manage the projects in the pipeline via virtually any known industrial manufacturing flow control techniques. Flows of these variables are calculated as their changes over time. As noted above, both these variables themselves and their changes over time allow project managers to structure their projects, implement tradeoffs within them, use changes in the market, competitive offerings, technology, etc. to dynamically effect value. For instance, project managers can use these metrics and plot, graph, evaluate, analyze, etc. the current net total value, a distribution of the current net total value, current option value, a distribution of the current option value, the underlying security value, a distribution of the underlying security value, the risk discount factor with an imposed distribution, a time discounted potential revenue, a distribution of the time discounted potential revenue, value improvement vs. risk reduction, value vs. current investment, etc. By analyzing and optimizing the flow of value along the entire pipeline, portfolio managers can account for the mutual influence of the projects on each other in such a way as to take decisions that optimize the total value created in the pipeline subject to constraints, e.g., in time or resources. They can use this information to optimize value in the portfolio by shifting resources from one project to another, canceling unpromising projects more quickly, adapting the objectives of the projects and/or other control actions.

The following illustrates another example of using the business method for managing projects via the flow of value. Consider a project at a phase gate. Assume the project leader has already obtained an estimate of the present value (PV). Also assume the project is associated one or more uncertainties that should be resolved before the project can pass through the phase-gate and an investment and schedule that attempts to remove the uncertainties over time. At each milepost within each phase, the project may be allowed to continue or may be terminated. Further, assume that a hurdle rate has been set for the PV of the project relative to its yearly expenditures. For purposes of this example, if the project is cancelled at this early stage it is regarded as a significant accomplishment and hence a predefined increased value is set as the discounted PV due to the fact that the resources will have been freed for other activities earlier than if the project had not uncovered the failure mode. Further assume that just after the current phase has ended the project exhibits equal probabilities of continuing in the next phase or being cancelled. For purposes of illustration, it is assumed that if after the first year the project remains on track, the probability of qualification in the coming year becomes 0.75 and that of cancellation becomes 0.25. These probabilities could be derived from the both the learning obtained during the year and from any changes in the ultimate value of the project imposed by externalities (e.g., competitive changes in the markets for the intended ultimate offering).

With these assumptions, the option value of the project following a risk-neutral decision tree method can be determined. Consider a project exiting one phase for which it is proposed to spend $1M for each of the next two years. Its PV, if successful, must exceed $10M to pass the hurdle rate, so it is assigned that figure as the maximum discounted PV at the end of both the first and second years. With the above assumptions, the PV of the project as it exits the current phase is PV(0)=0.5($10M)+0.5($2M)=$6M. After the end of the first year the new PV is PV(1U)=0.75($10M)+0.25($2M)=$8M, if the project is judged to have made enough progress to proceed, and PV(1L)=0($10M)+1 ($2M)=$2M if the project is cancelled. Thus, if the project is successful its value increases by $2M/$6M=33%, and if fails its value decreases by 4M/$6M=−67%. Consequently, using a risk free interest rate of 5% the effective probability of success, P, to be used in a risk free analysis of the value of an option to continue the project at the end of the first year is P (0.33)+(1−P)(−0.67)=0.05 or P~0.72. Hence the first year value of the project, taken as the value of the option to continue the project for the second year discounted risk free to the beginning of the first year is OP(1)=[(0.72) ($2M)+(0.28) (0)]/

1.05=$1.44M/1.05=$1.37M since the one year option to cancel is worthless if it is not exercised. This is much less than the assumed high value (i.e., hoped for) PV of the project, but fairly close to the cost of the project, illustrating the large multipliers on the project cost needed to attain the PV of the ultimate offering that must be imposed to make research projects financially viable.

Since it is assumed that meeting the mileposts during the first year have increased the probability of its continuing to the next phase to 0.75, the new PV of the project at the end of the first year is PV(1)=0.75($10M)+0.25($2M)=$8M. At the end of the second year the high and low values for the PV are PV(2U)=1 ($10M)+0 ($2M)=$10M, if the project passes and PV(2L)=0 ($10M)+1 ($2M)=$2M if it fails this review and it is cancelled. Again the effective probability of success needed for the risk free option evaluation is given by P ($2M/$8M)+ (1−P)(−$6M/$8M)=0.05, yielding P=0.8 and the value of an option to proceed for the second year as OP(2)=[0.8 ($2M)+ 0.2 (0)]/1.05=$1.6M/1.05=$1.52M.

The option for the second year is worth more than that for starting in the first year because the difference between the high and low values of the PV increases from $6M to $8M. This may be a consequence of the increase in the probability of meeting the phase gate criteria as one learns more going through the phase gate. It is possible, however, to cast the results of the calculation in a way that the increase in value of the option results from the fact that because of this shift in the PVs caused by the changes in probability of meeting the phase gate, the uncertainly in the value of achieving the phase gate in effect increased more in the second year than the first under our assumptions (i.e., the gap between the high and low values of the PV of the project at the end of the year was widened from $6M to $8M). This can be illustrated by casting the two PVs as symmetric about a mid point value with symmetric up and down fractional movements (e.g., u=PV [(n+1)U]/PV(n)=exp(a) and d=PV[(n+1)L]/PV(n)=1/u=exp (−a)). The two future PV values, PV[(n+1)U] and PV[(n+1) L] are the binary approximation of the Black-Scholes continuum theory of option evaluation with a being the standard deviation of the annual valuation of the asset for which the option has been written. In the Black-Scholes theory, as a increases the value of the option increases.

This result illustrates that as the probability of success for meeting the phase gate increases, the spread between the present value of exercising or not exercising the option in the formulation above increases as expected if the lower value is the abandonment option. This is a result of the fact that it permits (expects) the probabilities to change during the phase gate time frame due to the learning in the phase gate. This is different then conventional applications of real options theory wherein options to abandon are included in the decision tree and probabilities are assigned to them, but they are not included in the options analysis. Only the branch of the tree that contains the successful passage through the phase gate is subject to options analysis, and the probabilities to pass the phase gate or abandon the project are not regarded as dynamical variables that can change as a result of the work done in one of the research phases. Thus, unlike conventional techniques, the technique described herein allows the probabilities of exit from the phase gate to be dynamical variables influenced by the work during the phase gate.

This example demonstrates that using simple and reasonable assumptions, substantially all projects can be given a periodic option value (e.g., every year, quarter, etc.). In addition, once this option evaluation technique is adopted across a portfolio of projects, the flow of value through the technology pipeline can be measured and controlled using methods similar to those already tested and found to be useful. Moreover, the treatment of probabilities in the decision tree as dynamical variables that can be modified at the early stages of the tree by research performed during that stage is an innovation in option theory that produces qualitatively different sorts of results than in the conventional applications of the theory.

Although the below methods are described as a series of acts, it is to be understood that in alternative instances one or more of the acts can occur in a different order and/or concurrently occur with one or more other acts, and more or less acts can be used.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A business method for defining, controlling and optimizing a flow of value down a workflow pipeline using a computer system, comprising:
  creating by a processor a phase-gate workflow pipeline via a component of at least one project in which completion of one or more predetermined activities of each project advances the project to a succeeding phase in the pipeline;
  mapping by the processor each of the one or more activities of each project in the pipeline using a mapping component to a value metric that is a function of a risk discount factor using an option value technique, wherein the value metric of each project is dynamically updated while project activities are being performed by updating the corresponding risk discount factor and/or the probability of exiting its current phase gate; and
  implementing by the processor an analysis component that analyzes the flow of value down the pipeline and managing the at least one project based on analysis of the flow of value, wherein said analysis includes executing, by the processor, the steps of:
    determining a current present value PV(0) and expected high and low present values PV(nU), PV(nL) that represent a high and low estimate of a phase value after a select duration,
    determining a rate of increase of the projects after the select duration by dividing a difference of the expected high present value PV(nU) and the current present value PV(0) by the current present value PV(0),
    determining a rate of decrease by dividing a difference of the expected low present value PV(nL) and the current present value PV(0) by the current present value PV(0),
    determining a value representative of a current option using both the rates of increase and decrease and a probability of exiting a current phase as inputs in a function, and
    computing a net value for each project as the current option value less a current investment.

2. The method as set forth in claim 1, wherein the phase-gate workflow pipeline is a phase-gate research (R&D) offering-development pipeline.

3. The method as set forth in claim 2, wherein the phase-gate (R&D) offering-development pipeline includes a series of phase gates in which each phase gate is associated with exit criteria.

4. The method as set forth in claim 2, wherein the phase-gate (R&D) offering-development pipeline includes a series of phase gates spanning a life cycle of each offering.

5. The method as set forth in claim 1, further including determining a project value for each project from the aggregate value of the activities in each project.

6. The method as set forth in claim 5, wherein the project value for each project at any time is a function of the value of completed activities and the value of prospective activities for each project.

7. The method as set forth in claim 5, wherein the project value for each project at any time is related to the cost of project activities continuing until the project reaches its next phase gate.

8. The method as set forth in claim 1, further including determining a portfolio value from the aggregate value of each project.

9. The method as set forth in claim 1, further including funding each project based on its contribution to the flow of value down the pipeline.

10. The method as set forth in claim 1, wherein the risk discount factor is updated through a prescribed process for assessing the elements of risk affecting the ultimate value of the associated project.

11. The method as set forth in claim 10, wherein the prescribed process includes an assessment of product risk, market risk, value chain risk, technology risk, and management risk.

12. The method as set forth in claim 1, wherein the value metric of each project is periodically evaluated to monitor the ongoing value of one or more of the projects.

13. The method as set forth in claim 1, further including periodically reviewing updated value metrics in order to determine the flow of value down the pipeline.

14. The method as set forth in claim 1, further including periodically reviewing resources required to advance each project through its phases of the pipeline.

15. The method as set forth in claim 1, further including periodically optimizing value of resources by plotting the flow as the current option value over time.

16. The method as set forth in claim 1, further including determining changes in the resourcing of each project in the pipeline based on optimizing the current and prospective flow of value in the pipeline subject to constraints imposed by a rate of value creation by the individual projects and the availability of resources for the entire pipeline of the at least one project.

17. A computer system that facilitates defining, controlling and optimizing a flow of value down a workflow pipeline, comprising:
a processor, said processor further comprising:
a component that creates a phase-gate workflow pipeline for at least one project, each including one or more activities;
a mapping component that maps each of the one or more activities of each project to a value that is a function of a risk discount factor using an option value technique, said value being dynamically updated while project activities are being performed by updating the corresponding risk discount factor, said mapping component including:
a security price generator that computes a security price as a product of said risk discount factor and estimated profits;
an option value to advance generator that converts each security price into an option value to advance, the option value to advance generator being configured to determine a current present value PV(0) and expected high and low present values PV(nU), PV(nL) each based on a maximum discounted present value that estimates a phase value after a select duration, the option value to advance generator further configured to compute rates of increase and decrease for alternatives of phase success or cancellation by dividing a difference of the expected high and low present values, respectively, and the current phase value by the current phase value, the option value to advance generator further being configured to compute a probability by providing the rates as input in a function and determining an option value to advance using the probability;
a current option value generator that computes a current option value as a product of the option value to advance and a probability of exiting a current phase; and
a net value generator that computes a net value for each project as the current option value less a current investment; and
an analysis component that analyzes the flow of value down the pipeline and outputs one or more metrics used to dynamically manage the at least one project in the pipeline.

* * * * *